H. KOHLMYER.
BOLT LOCKING DEVICE.
APPLICATION FILED AUG. 31, 1918.
1,304,575.
Patented May 27, 1919.
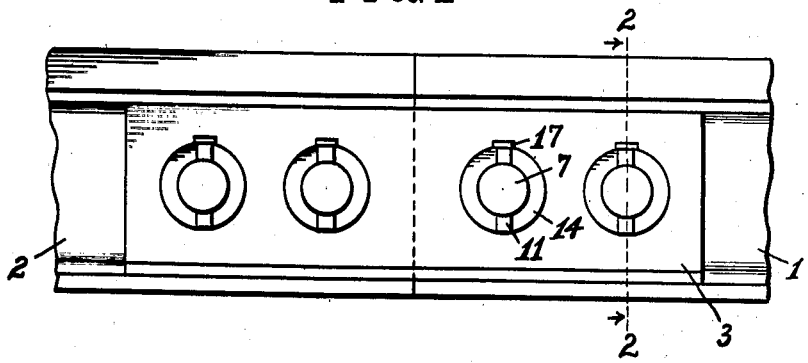
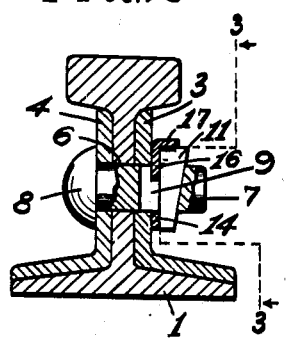
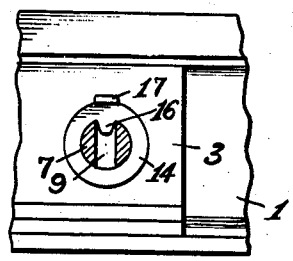
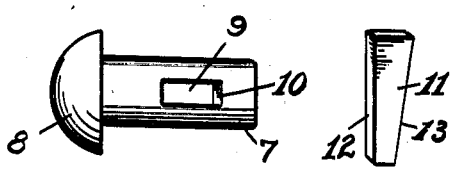
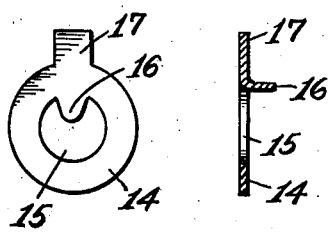
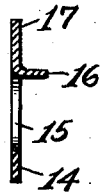
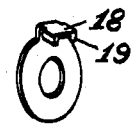
Inventor
Henry Kohlmyer
By his Attorney

UNITED STATES PATENT OFFICE.

HENRY KOHLMYER, OF LORAIN, OHIO.

BOLT-LOCKING DEVICE.

1,304,575.   Specification of Letters Patent.   Patented May 27, 1919.

Application filed August 31, 1918. Serial No. 252,255.

*To all whom it may concern:*

Be it known that I, HENRY KOHLMYER, a citizen of the United States, residing at Lorain, in the county of Lorain and State of Ohio, have invented certain new and useful Improvements in Bolt-Locking Devices, of which the following is a specification.

This invention relates to bolts and more especially to means for locking bolts in position instead of employing the usual thread and nut.

The main object of the invention is to provide a device for holding parts together, as for instance, the fish-plates used in connecting the joints of rails to the sides of the rails, which device will not jar loose as is the case with the ordinary nuts and bolts.

Another object of the invention is to provide a device of said character, which is simple, inexpensive to manufacture, reliable in use, easily applied, and easily removed when it is desired to disconnect the part joined together.

With the above and other objects in view as will be readily understood, the invention will be hereinafter fully described, and the novel features thereof will be particularly pointed out in the appended claims.

In the drawings like characters of reference are used to designate corresponding parts.

Figure 1 is a side elevation of a pair of rail ends connected by fish-plates, illustrating the use of my device, Fig. 2 is a cross sectional view taken on line 2—2 of Fig. 1, Fig. 3 is a section of Fig. 2 taken on line 3—3, Fig. 4 is a plan view of the bolt, Fig. 5 is a perspective view of the wedge.

Fig. 6 is a face view of the locking-washer, with the tongue as made before applying the washer to the bolt, Fig. 7 is a sectional view of the locking-washer, with the tongue turned up for applying the washer to the bolt, and Fig. 8 is a perspective view of a modification of the locking-washer.

Referring to the drawings, 1 and 2 represent the ends of a pair of rails to be joined together by a pair of fish-plates 3 and 4 arranged at the sides thereof in the usual manner. The web of the rails and the fish-plates are provided with transverse alining openings, indicated by 6, for receiving a bolt 7, having a head 8 at one end. The other end of the bolt projects beyond the fish-plate, and is provided with a longitudinal recess 9, extending therethrough and having a forward inclined wall 10. A wedge 11 having a straight face 12 and an opposite inclined face 13 is adapted to enter the recess 9 of the bolt, and said inclined face coöperates with the inclined wall 10 of the bolt for drawing the bolt tight. For the purpose of locking the wedge 11 in the recess 9 of the bolt after it has been driven therein, a locking-washer 14 is employed. This locking-washer consists of a flat disk of steel or other suitable material having a central opening 15 slightly larger than the bolt 7 for passing thereover. From one edge of the opening of the locking-washer projects a tongue 16, which is formed integrally therewith and is adapted to enter the recess 9 of the bolt, and thereby prevent the washer rotating upon the bolt. Extending from the outer edge of the locking-washer opposite the tongue 16, and forming an integral part of the locking-washer, is a lug 17, which is adapted to be bent against the larger end of the wedge 11 for locking it in position. The locking-washer 14 is first made flat, as shown in Fig. 6, and the tongue 16 is afterward bent outwardly, as shown in Fig. 7, so that the opening 15 will pass over the bolt. The tongue is then bent back within the recess 9 to its original flat position. The wedge is driven into the recess 9 of the bolt, with its straight face 12 against the washer and its inclined face sliding upon the inclined wall 10 of the recess. After the wedge has been driven tightly into the recess of the bolt, the lug 17, is bent against the larger end to prevent the wedge jarring loose, and thus securely locking it in position. To remove the bolt, it is easy to pry up the lug 17, knock out the wedge 11, and bend up the tongue 16 in order to disengage the locking-washer from the bolt.

In the modification of the locking-washer in Fig. 8, the tongue 16 is omitted, and the lug 18 is formed with ears 19, which are adapted to be bent downwardly at the sides of the wedge 11, after the lug is bent against the top of the same for preventing the locking-washer rotating with relation to the bolt.

The device illustrated in the drawings and described, is useful for many purposes besides connecting the joints of rails, as is obvious, and it will be understood that slight changes in the details of construction may be made within the scope of the claims.

Having fully described my invention, what I claim is:

1. The combination of a bolt, the bolt having a head at one end and a recess through the bolt, a wedge adapted to enter the recess of the bolt, a washer, the washer being provided with means for entering the recess of the bolt to prevent movement with relation to the bolt, and the washer having means for locking the wedge in position, substantially as described.

2. The combination of a bolt, the bolt having a head at one end and a recess through the bolt, a wedge adapted to enter the recess of the bolt, a washer, the washer being provided with a tongue for entering the recess of the bolt to prevent rotation of the washer upon the bolt, and the washer having means for locking the wedge in position, substantially as described.

3. The combination of a bolt, the bolt having a head at one end and a recess through the bolt, a wedge adapted to enter the recess of the bolt, a washer, the washer being provided with an opening, for passing over the bolt, a tongue projecting from one edge of the opening for entering the recess of the bolt to prevent rotating of the washer upon the bolt, and a lug extending from the outer edge of the washer and adapted to be bent against the larger end of the wedge to lock it in position, substantially as described.

4. The combination of a bolt, the bolt having a head at one end and a recess through the bolt, a wedge adapted to enter the recess of the bolt, a washer, the washer having a lug for engaging the wedge to lock it in position, and the lug having ears at the sides thereof adapted to be bent down at the sides of the wedge to prevent rotation of the washer with relation to the bolt, substantially as described.

In testimony whereof I affix my signature.

HENRY KOHLMYER.